(12) United States Patent
Yang et al.

(10) Patent No.: US 10,231,070 B2
(45) Date of Patent: Mar. 12, 2019

(54) VOICE INPUT EXCEPTION DETERMINING METHOD, APPARATUS, TERMINAL, AND STORAGE MEDIUM

(71) Applicant: Huawei Technologies Co., Ltd., Shenzhen (CN)

(72) Inventors: Lin Yang, Beijing (CN); Zhaoyang Yin, Beijing (CN); Jingwen Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/574,405

(22) PCT Filed: Apr. 29, 2016

(86) PCT No.: PCT/CN2016/080716
§ 371 (c)(1),
(2) Date: Nov. 15, 2017

(87) PCT Pub. No.: WO2017/185342
PCT Pub. Date: Nov. 2, 2017

(65) Prior Publication Data
US 2018/0139554 A1    May 17, 2018

(51) Int. Cl.
*H04R 29/00* (2006.01)
*G10L 25/21* (2013.01)
(Continued)

(52) U.S. Cl.
CPC ............ *H04R 29/005* (2013.01); *G10L 25/21* (2013.01); *H04R 1/406* (2013.01); *H04R 3/005* (2013.01); *H04R 2499/11* (2013.01)

(58) Field of Classification Search
CPC .. H04R 2430/03; H04R 29/00; H04R 29/001; H04R 2225/41; H04R 25/407;
(Continued)

(56) References Cited

U.S. PATENT DOCUMENTS 5,611,019 A * 3/1997 Nakatoh ............... G10L 15/063
704/233
8,942,386 B2 * 1/2015 Marash .................. H04R 3/005
381/92
(Continued)

FOREIGN PATENT DOCUMENTS

CN    101419795 A    4/2009
CN    102324229 A    1/2012
(Continued)

OTHER PUBLICATIONS

Machine Translation and Abstract of Chinese Publication No. CN101419795, Apr. 29, 2009, 19 pages.
(Continued)

*Primary Examiner* — Lun-See Lao
(74) *Attorney, Agent, or Firm* — Conley Rose, P.C.

(57) ABSTRACT

A voice input exception determining method, an apparatus, a terminal, and a storage medium are provided. The method is applied to an electronic device including an audio collection module, and includes determining whether an amplitude value of an audio signal collected by the audio collection module is less than a preset amplitude threshold and/or whether energy distribution of the audio signal meets a preset condition; and if the amplitude value of the audio signal is less than the preset amplitude threshold and/or the energy distribution of the audio signal does not meet the preset condition, determining that voice input of the electronic device is abnormal. A solution provided in the present disclosure resolves a problem that there is no effective method for determining a sound reception exception caused when a sound reception hole of the electronic device is blocked.

20 Claims, 2 Drawing Sheets

(51) Int. Cl.
*H04R 1/40* (2006.01)
*H04R 3/00* (2006.01)

(58) Field of Classification Search
CPC .. H04R 25/552; H04R 25/554; H04R 29/002; H04R 29/004; H04R 29/007; H04R 3/12; H04S 2400/01; H04S 2420/01; H04S 2420/07; H04S 3/008; H04S 7/301; H04S 1/007; H04S 2400/09; H04S 2400/11; H04S 3/02; H04S 7/302
USPC ............... 381/54–58, 92, 93, 98, 110, 111; 704/200, 274, 500, 224, 503
See application file for complete search history.

(56) References Cited

U.S. PATENT DOCUMENTS

| | | | |
|---|---|---|---|
| 2002/0136416 A1* | 9/2002 | Steenhagen | G10K 11/18 381/93 |
| 2009/0296946 A1 | 12/2009 | Zhang | |
| 2013/0136273 A1 | 5/2013 | Marash et al. | |
| 2016/0379670 A1* | 12/2016 | Wang | G10L 25/78 704/233 |
| 2017/0076739 A1 | 3/2017 | Xu | |

FOREIGN PATENT DOCUMENTS

| | | | | |
|---|---|---|---|---|
| CN | 103578470 | * | 2/2014 | ............ G10L 15/08 |
| CN | 103578470 | A | 2/2014 | |
| CN | 105338148 | A | 2/2016 | |
| WO | 2009097407 | A1 | 8/2009 | |
| WO | 2014037766 | A1 | 3/2014 | |

OTHER PUBLICATIONS

Machine Translation and Abstract of Chinese Publication No. CN102324229, Jan. 18, 2012, 27 pages.

Machine Translation and Abstract of Chinese Publication No. CN103578470, Feb. 12, 2014, 37 pages.

Foreign Communication From A Counterpart Application, PCT Application No. PCT/CN2016/080716, English Translation of International Search Report dated Jan. 5, 2017, 2 pages.

Foreign Communication From A Counterpart Application, European Application No. 16895743.9, Extended European Search Report dated Jun. 28, 2018, 8 pages.

Foreign Communication From A Counterpart Application, Canadian Application No. 2981775, Canadian Office Action dated Apr. 26, 2018, 5 pages.

* cited by examiner

VOICE INPUT EXCEPTION DETERMINING METHOD, APPARATUS, TERMINAL, AND STORAGE MEDIUM

CROSS-REFERENCE TO RELATED APPLICATIONS

This application is a National Stage of International Patent Application No. PCT/CN2016/080716, filed on Apr. 29, 2016, which is hereby incorporated by reference in its entirety.

TECHNICAL FIELD

The present disclosure relates to the field of electronic technologies, and in particular, to a voice input exception determining method, an apparatus, a terminal, and a storage medium.

BACKGROUND

As electronic technologies develop and consumer demands increase, increasingly more electronic products appear, such as smartphones and tablet computers. These electronic devices greatly facilitate user's life and work. Usually, all these electronic devices provide an audio collection function, to collect an audio signal.

In some approaches, to prevent a mobile phone housing from blocking an audio signal and achieve a good sound reception effect, a hole is usually disposed on a housing of an electronic device and used as a sound reception hole of an audio collection module, and the sound reception hole is connected to the audio collection module. However, because the electronic device is in a complex environment, the sound reception hole is often blocked and sound information collection of the audio collection module is affected. In some existing voice detection methods, only whether an algorithm of a collected audio signal is normal can be detected. There is no effective method for detecting a sound reception exception caused when the sound reception hole of the electronic device is blocked, and the user cannot be notified of the sound reception exception or no remedy can be provided for the sound reception exception. Consequently, user experience is affected.

SUMMARY

The present disclosure provides a voice input exception determining method, an apparatus, a terminal, and a storage medium. A problem is there is no effective method for determining a sound reception exception caused when a sound reception hole of an electronic device is blocked, a user cannot be notified of the sound reception exception or no remedy can be provided for the sound reception exception, and consequently, user experience is affected.

A first aspect provides a voice input exception determining method, where the method is applied to an electronic device including an audio collection module, and includes determining whether an amplitude value of an audio signal collected by the audio collection module is less than a preset amplitude threshold and/or whether energy distribution of the audio signal meets a preset condition; and if the amplitude value of the audio signal is less than the preset amplitude threshold and/or the energy distribution of the audio signal does not meet the preset condition, determining that voice input of the electronic device is abnormal.

When a sound reception hole is blocked, the audio collection module cannot normally collect the audio signal, and consequently, both a time domain feature and a frequency domain feature of the collected audio signal are abnormal. According to the solution provided in this embodiment of the present disclosure, the time domain (an audio amplitude) feature and the frequency domain (an energy value of a frequency) feature of the collected audio signal are comprehensively determined, to determine, according to a determining result, whether the voice input is abnormal. In addition, by using a method of comprehensively detecting an input amplitude value and an input frequency that are of a microphonerophone, microphone input exception detection precision can be effectively improved.

To achieve a better support effect, when holding a mobile terminal, a user holds the bottom of the mobile terminal by using a finger. In this case, the finger easily blocks the sound reception hole, and consequently, a call or voice transmission is silenced. Therefore, for this case, the present disclosure further provides a possible design. Before the determining whether an amplitude value of the audio signal is less than a preset amplitude threshold and/or whether energy distribution of the audio signal meets a preset condition, the method includes detecting whether a voice channel is established, and if it is detected that the voice channel is established, determining whether the amplitude value of the audio signal is less than the preset amplitude threshold and/or whether the energy distribution of the audio signal meets the preset condition.

In this possible design, an amplitude and energy are determined only when it is detected that the electronic device establishes the voice channel, so that the problem that a call or voice transmission is silenced can be resolved, and power can be saved.

In another possible design, the determining whether energy distribution of the audio signal meets a preset condition includes performing Fourier frequency domain conversion on the audio signal, to determine an energy value of the audio signal; calculating a sum of energy values of audio signals whose frequency is higher than a preset frequency and using the sum as a high-frequency energy value, and calculating a sum of energy values of audio signals whose frequency is lower than the preset frequency and using the sum as a low-frequency energy value; and determining whether a ratio of the high-frequency energy value to the low-frequency energy value is less than a preset threshold, and if the ratio of the high-frequency energy value to the low-frequency energy value is less than the preset threshold, determining that the energy distribution of the audio signal does not meet the preset condition.

When the sound reception hole is blocked, an energy value of each frequency in the audio signal is affected. Therefore, in this possible design, based on the feature that exists when the sound reception hole is blocked, the Fourier frequency domain conversion is performed on the audio signal to obtain the energy value of each frequency, so that whether the sound reception hole of the electronic device is blocked can be determined according to the energy value of each frequency.

It is determined, in the foregoing manner, that the sound reception hole of the electronic device encounters a problem. Correspondingly, a corresponding solution may be provided in the following manner. After the determining that voice input of the electronic device is abnormal, the method further includes adjusting the audio collection module configured to collect the audio signal; or outputting prompt information, where the prompt information is used to notify a user that the voice input of the electronic device is abnormal.

In another possible design, when the electronic device includes multiple audio collection modules, the adjusting the audio collection module configured to collect the audio signal includes determining a first audio collection module that is currently being used; and enabling a second audio collection module in the multiple audio collection modules to collect the audio signal, where the second audio collection module is any one of the multiple audio collection modules except the first audio collection module.

According to the solution in this embodiment of the present disclosure, after the sound reception hole encounters the problem, a solution can be effectively provided in the foregoing manner in time, and another audio collection module is enabled to receive sound or notify the user, so that the user can resolve the problem as soon as possible.

In another possible design, the preset amplitude threshold is obtained in the following manner, including obtaining the preset amplitude threshold according to audio signals collected in multiple times when the sound reception hole is blocked.

Further implementation may be obtaining the preset amplitude threshold by collecting audio signals with different sound wave features; or when the sound reception hole is blocked in different blocking manners, calculating amplitude values of audio signals collected by the audio collection module, and calculating an average value of the obtained amplitude values of the audio signals to obtain the preset amplitude threshold.

In this possible design, audio signals in various scenarios are collected and used as a basis for calculating the preset amplitude threshold, so that the preset amplitude threshold can adapt to different scenarios more accurately, and an error in determining a voice input exception of the electronic device is reduced.

In another possible design, the enabling a second audio collection module to collect the audio signal includes determining priorities of the multiple audio collection modules disposed in the electronic device, and selecting an audio collection module from the multiple audio collection modules as the second audio collection module according to a priority descending rule.

In this possible design, an implementation of selecting the second audio collection module from the multiple audio collection modules is provided, so that a fault tolerance and avoidance method can be provided after the voice input of the electronic device is abnormal, and impact exerted when the device cannot effectively collect voice input data due to a microphone input exception can be reduced.

A second aspect provides an electronic device, including an audio collection module configured to collect an audio signal; a memory configured to store an instruction; and a processor configured to invoke the instruction stored in the memory, so as to determine whether an amplitude value of the audio signal collected by the audio collection module is less than a preset amplitude threshold and/or whether energy distribution of the audio signal meets a preset condition; and if the amplitude value of the audio signal is less than the preset amplitude threshold and/or the energy distribution of the audio signal does not meet the preset condition, determine that voice input of the electronic device is abnormal.

The processor invokes the instruction stored in the memory, so as to implement the solution in the method design in the foregoing first aspect. For a problem-resolving implementation and beneficial effects of the electronic device, refer to the foregoing first aspect and possible implementations and beneficial effects of the first aspect. Therefore, for implementation of the electronic device, refer to the implementation of the method. Repeated parts are not described.

A third aspect provides an apparatus, where the apparatus is disposed in an electronic device, the electronic device includes at least an audio collection module, and the apparatus includes a comparison module configured to determine, by means of comparison, whether an amplitude value of an audio signal collected by the audio collection module is less than a preset amplitude threshold and/or whether energy distribution of the audio signal meets a preset condition; and a determining module configured to if the amplitude value of the audio signal is less than the preset amplitude threshold and/or the energy distribution of the audio signal does not meet the preset condition, determine that voice input of the electronic device is abnormal.

Based on a same disclosure concept, for a problem-resolving principle and beneficial effects of the apparatus, refer to the foregoing first aspect and possible implementations and brought beneficial effects of the first aspect. Therefore, for implementation of the apparatus, refer to the implementation of the method. Repeated parts are not described.

A fourth aspect provides a nonvolatile computer readable storage medium storing one or more programs, where the one or more programs include an instruction, and when the instruction is executed by an electronic device including an audio collection module, the electronic device performs the foregoing first aspect and possible implementations of the first aspect.

Based on a same disclosure concept, when the program stored in the nonvolatile computer readable storage medium is executed by the electronic device including the audio collection module, for a problem-resolving principle and beneficial effects, refer to the foregoing first aspect, possible implementations of the first aspect, and brought beneficial effects. Therefore, for implementation of the nonvolatile computer readable storage medium, refer to the implementation of the method. Repeated parts are not described.

According to the method and the apparatus provided in embodiments of the present disclosure, the time domain feature and the frequency domain feature of the collected audio signal are comprehensively determined, to determine, according to the determining result, whether the voice input is abnormal. A problem is there is no effective method for determining a sound reception exception caused when the sound reception hole of the electronic device is blocked, the user cannot be notified of the sound reception exception or no remedy can be provided for the sound reception exception, and consequently, user experience is affected.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In an existing voice detection method, only whether there is a problem in a voice algorithm of a collected audio signal can be detected, but there is no appropriate method for determining effectiveness and accuracy of data collection performed by an audio collection module (for example, a microphone). Therefore, to facilitate audio signal collection performed by the microphone, a sound reception hole is provided on a housing of an electronic device, and the sound reception hole is connected to the audio collection module. Because the sound reception hole may be disposed on a mobile phone housing, the sound reception hole may be blocked when a user holds the electronic device or there is an object around the electronic device, and consequently, accuracy of audio signal collection performed by the audio collection module is affected, for example, the microphone picks up low sound or no sound. For a similar problem, there has been no better improvement measure. Therefore, the present disclosure provides a voice input exception determining method for an electronic device, to alleviate the foregoing problem. The following further describes the embodiments of the present disclosure in detail with reference to the accompanying drawings.

Figure 1:
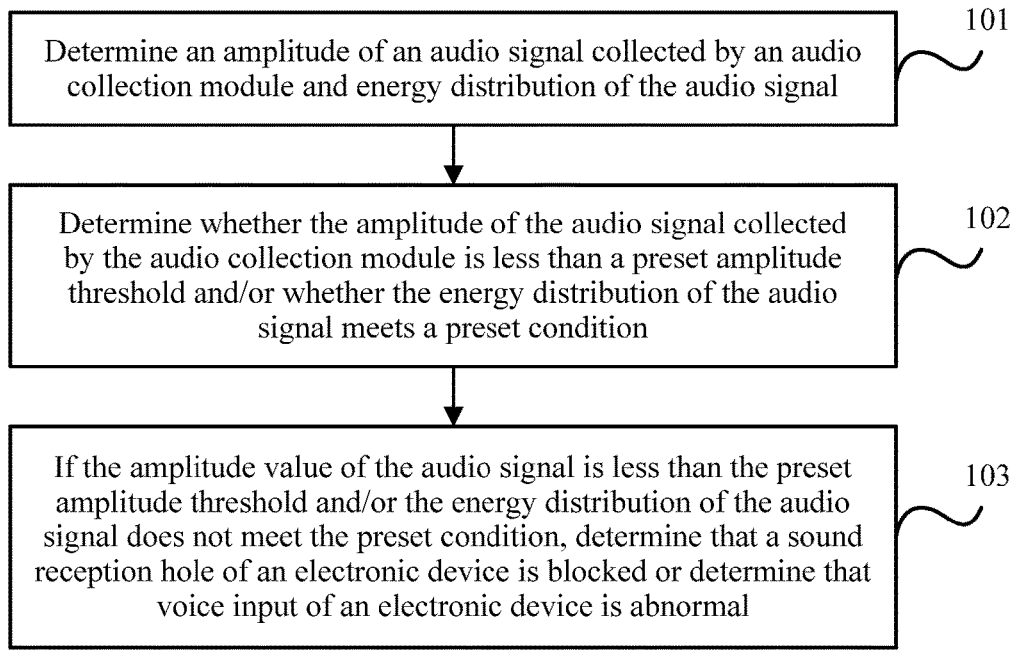
FIG. 1 is a schematic flowchart of a voice input exception determining method for an electronic device according to an embodiment of the present disclosure.

As shown in FIG. 1, this embodiment of the present disclosure provides a voice input exception determining method. The method is applied to an electronic device including an audio collection module, and includes the following steps.

The method provided in this embodiment of the present disclosure may be applicable to all electronic devices on which an audio collection module (which may be a microphone in an implementation) is disposed. The electronic device collects sound information by using the audio collection module, and converts the sound information into an analog audio signal. A sound reception hole is provided on a housing of the electronic device, and the sound reception hole is connected to the audio collection module. To achieve a better sound reception effect, a sound reception hole may be disposed at the bottom of a mobile terminal. However, to achieve a better support effect, when holding the mobile terminal, a user may hold the bottom of the mobile terminal by using a finger. In this case, the finger easily blocks the sound reception hole, and consequently, a call or voice transmission is silenced.

Step 101, determine an amplitude of an audio signal collected by the audio collection module and energy distribution of the audio signal.

Preferably, to resolve the problem that a call or voice transmission is silenced, and to save power, before it is determined whether the amplitude of the audio signal is less than a preset amplitude threshold and/or whether the energy distribution of the audio signal meets a preset condition, it is detected whether a voice channel is established. If it is detected that the voice channel is established, it is determined whether the amplitude of the audio signal is less than the preset amplitude threshold and/or whether the energy distribution of the audio signal meets the preset condition.

The amplitude value of the audio signal may be determined by using the following method. An audio signal in a unit period is sampled to obtain a sampling value of the audio signal, an absolute value of an amplitude of the sampling value of the audio signal is calculated, and an average value of absolute values of amplitudes of multiple sampling values is calculated to obtain an average value of amplitudes of sampling values of audio signals. The average value is the amplitude value of the audio signal.

The following step 102 and step 103 describe, in detail, a method for determining, by comprehensively determining a time domain feature and a frequency domain feature of the collected audio signal, whether voice input of the electronic device is abnormal.

Step 102, determine whether the amplitude of the audio signal collected by the audio collection module is less than a preset amplitude threshold and/or whether the energy distribution of the audio signal meets a preset condition.

First, time domain analysis is performed on the audio signal collected by the audio collection module, to determine whether the amplitude of the audio signal collected by the audio collection module is less than the preset amplitude threshold.

If the sound reception hole is blocked, the amplitude of the audio signal collected by the audio collection module is greatly reduced, and may be less than the preset amplitude threshold.

Preferably, when the amplitude of the audio signal collected by the audio collection module is less than the preset amplitude threshold, it is determined whether duration in which the amplitude of the audio signal collected by the audio collection module is less than the preset amplitude threshold is greater than preset duration. The preset duration may be dynamically set according to a design requirement.

The preset amplitude threshold in this embodiment of the present disclosure may be obtained by means of experimentation. That is, the sound reception hole is blocked, an audio signal is collected when the sound reception hole is blocked, and an amplitude of the audio signal collected when the sound reception hole is blocked is the preset amplitude threshold. Optionally, the audio signal may be collected multiple times after the sound reception hole is blocked, an average value of amplitudes of audio signals collected in the multiple times is obtained, and the obtained average value is used as the preset amplitude threshold. In an implementation, when the preset amplitude threshold is obtained by collecting the audio signal multiple times, the preset amplitude threshold may be obtained by collecting audio signals with different sound wave features (for example, sound of a man, a woman, the old, and a child). In an implementation, the sound reception hole may be blocked in different blocking manners (for example, the sound reception hole is blocked at different blocking angles or by using different objects), amplitudes of audio signals collected by the audio collection module in the different blocking manners are separately obtained, and an average value of the obtained amplitudes of the audio signals is calculated to obtain the preset amplitude threshold.

The audio collection module collects an audio signal in a user voice call, calculates an amplitude value of the audio signal in the user voice call, and compares the amplitude value of the audio signal in the user voice call with the preset amplitude threshold, to determine whether the amplitude value of the audio signal in the user voice call is less than the preset amplitude threshold, that is, to determine whether the amplitude value of the audio signal collected by the audio collection module is less than the preset amplitude threshold.

Second, frequency domain analysis is performed on the audio signal collected by the audio collection module, to determine whether the energy distribution of the audio signal meets the preset condition.

A low-frequency signal has stronger energy, and a high-frequency signal has weaker energy. When the sound reception hole is blocked, the audio collection module may collect, by using the sound reception hole, most low-frequency signals by using a gap or by means of housing resonance, but the audio collection module cannot collect most high-frequency signals by using the sound reception hole. Therefore, when the sound reception hole is blocked, the audio signal collected by the audio collection module is mainly the low-frequency signal.

The energy distribution of the audio signal is obtained after Fourier FFT transformation is performed on the collected audio signal. It is determined whether the energy distribution of the collected audio signal meets the preset condition (that is, a sum of energy values of audio signals whose frequency is higher than a preset frequency is calculated and used as a high-frequency energy value, and a sum of energy values of audio signals whose frequency is lower than the preset frequency is calculated and used as a low-frequency energy value; it is determined whether a ratio of the high-frequency energy value to the low-frequency energy value is less than a preset threshold; and if the ratio of the high-frequency energy value to the low-frequency energy value is less than the preset threshold, the energy distribution of the audio signal does not meet the preset condition).

Step 103, if the amplitude value of the audio signal is less than the preset amplitude threshold and/or the energy distribution of the audio signal does not meet the preset condition, determine that a sound reception hole of the electronic device is blocked or determine that voice input of the electronic device is abnormal.

After the sound reception hole of the electronic device is blocked, processing may be performed in the following manners, and includes the following content.

In a processing manner, prompt information is output. The prompt information is used to notify a user that the voice input of the electronic device is abnormal.

In another processing manner, the electronic device adjusts, according to a quantity of audio collection modules disposed in the electronic device, the audio collection module configured to collect the audio signal, including when the electronic device includes at least two audio collection modules and a first audio collection module is currently being used, enabling a second audio collection module to collect the audio signal, where the second audio collection module is any audio collection module in the electronic device other than the first audio collection module.

Optionally, to reduce power consumption of the electronic device, the first audio collection module is disabled after the second audio collection module is enabled to collect the audio signal. In addition, in this embodiment, when the second audio collection module is selected from multiple audio collection modules, the second audio collection module may be selected in descending order of preset priorities of the multiple audio collection modules (the second audio collection module has a highest priority in the multiple audio collection modules except the first audio collection module).

For example, when the electronic device includes multiple sound reception holes (for example, the electronic device includes three sound reception holes a sound reception hole a, a sound reception hole b, and a sound reception hole c), when the electronic device collects an audio signal by using the sound reception hole a and the sound reception hole a is blocked, and the electronic device currently collects the audio signal by using an audio collection module corresponding to the sound reception hole a, the electronic device may enable an audio collection module corresponding to the sound reception hole b or the sound reception hole c, to collect the audio signal, and disable the audio collection module corresponding to the sound reception hole a used for collecting the audio signal.

To describe the method in this embodiment of the present disclosure more clearly and with more details, in the following example, one or more mics are disposed on a mobile phone, to describe implementation of the adjusting, by the electronic device according to a quantity of audio collection modules disposed in the electronic device, the audio collection module configured to collect the audio signal.

The mobile phone is used as an example. A microphone hole is the sound reception hole in this embodiment of the present disclosure, and a microphone is the audio collection module in this embodiment of the present disclosure.

When it is determined in a call process of the mobile phone that a microphone hole used in a current call is blocked and duration exceeds three seconds, a microphone array of the mobile phone is detected, to determine a quantity of mics included in the mobile phone.

If the mobile phone includes only one microphone, the user is notified, by using a prompt tone, text, vibration, or the like, that the microphone hole is blocked.

If the mobile phone includes at least two mics (for example, three mics a primary microphone, a secondary microphone, and a third microphone), and the primary microphone is used in a current call, when it is detected that a primary microphone hole is blocked, a microphone other than the primary microphone is selected according to a preset priority to perform a call. The priority may be determined according to quality of an audio signal collected by each microphone, for example, a priority of the primary microphone>a priority of the secondary microphone>a priority of the third microphone. When the primary microphone hole is blocked, the secondary microphone with a highest priority except the primary microphone may be preferentially enabled to collect the audio signal. Preferably, an audio parameter is switched to an audio parameter that adapts to the secondary microphone.

In an optional implementation, when the mobile phone includes at least two mics and it is detected that a microphone hole used in a current call is blocked, the user is notified, by using a prompt tone, text, vibration, or the like, that the microphone hole is blocked.

According to the method provided in this embodiment of the present disclosure, the time domain feature and the frequency domain feature of the collected audio signal are comprehensively determined, to determine, according to a determining result, whether the voice input is abnormal. Therefore, a problem of ineffective audio collection caused when the sound reception hole of the audio collection module is blocked is resolved. In addition, by using a method of comprehensively detecting an input amplitude value and an input frequency that are of the microphone, microphone input exception detection precision can be effectively improved.

According to the method provided in this embodiment of the present disclosure, after the voice input of the electronic device is abnormal, the prompt information is output, to notify the user that the voice input of the electronic device is abnormal. Therefore, a voice input exception that appears when the user uses the device is reduced, and user experience is improved.

In addition, according to the method provided in this embodiment of the present disclosure, after the voice input of the electronic device is abnormal, the voice input of the electronic device is recovered by automatically adjusting the audio collection module configured to collect the audio signal. By using this fault tolerance and avoidance method, impact exerted when the device cannot effectively collect voice input data due to a microphone input exception can be reduced.

Figure 2:
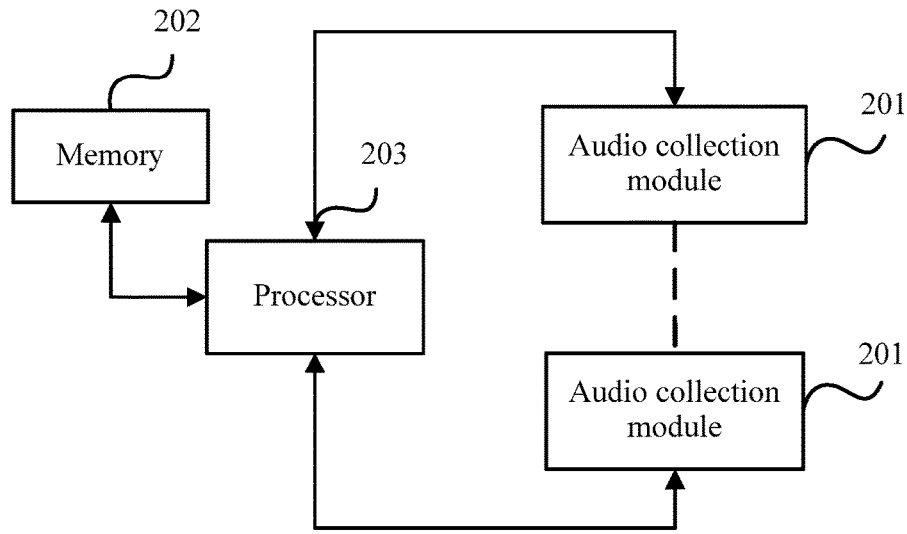
FIG. 2 is a schematic structural diagram of an electronic device according to an embodiment of the present disclosure.

As shown in FIG. 2, this embodiment of the present disclosure provides an electronic device. The electronic device includes an audio collection module 201, a memory 202, and a processor 203.

The audio collection module 201 is configured to collect an audio signal.

In an application environment, the audio collection module may be of a structure including an audio collection function, such as a microphone.

The memory 202 is configured to store an instruction.

The processor 203 is configured to invoke the instruction stored in the memory 202, so as to determine whether an amplitude value of the audio signal collected by the audio collection module is less than a preset amplitude threshold and/or whether energy distribution of the audio signal meets a preset condition; and if the amplitude value of the audio signal is less than the preset amplitude threshold and/or the energy distribution of the audio signal does not meet the preset condition, determine that voice input of the electronic device is abnormal.

The processor invokes the instruction stored in the memory, so as to implement the implementations of the foregoing method embodiment. Therefore, for implementation of the electronic device, refer to the implementation of the method. Repeated parts are not described.

Figure 3:
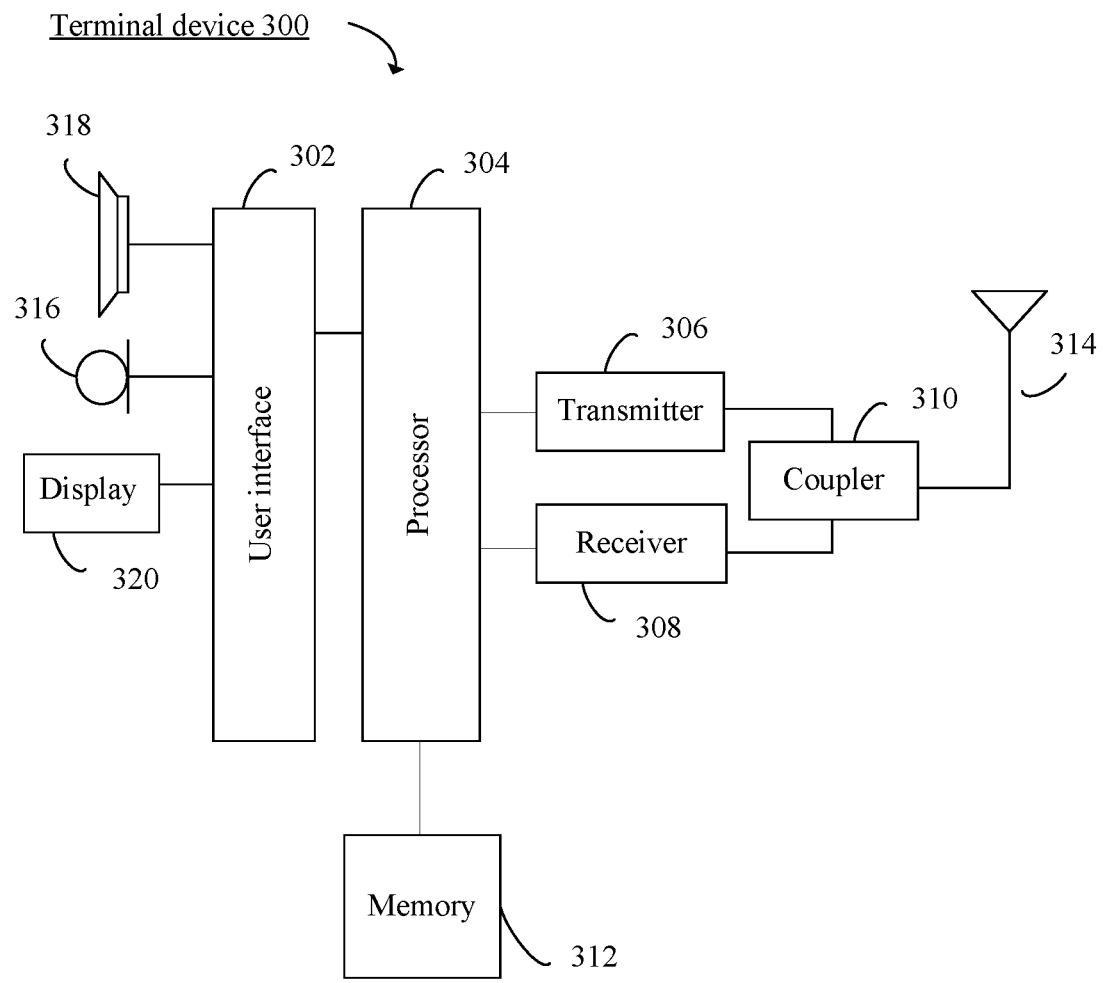
FIG. 3 is a schematic structural diagram of a terminal device according to an embodiment of the present disclosure.

As shown in FIG. 3, an audio collection and detection manner provided in this embodiment of the present disclosure may be applied to a terminal device. In this case, this embodiment of the present disclosure further provides an implementation structure of a terminal (or referred to as a terminal device) 300, and the terminal 300 may include an input/output module (including an audio output module 318, an audio input module 316, a display 320, and the like), a user interface 302, a processor 304, a transceiver (which may be an independent module on which receiving and sending functions are integrated, or may include a transmitter 306 and a receiver 308), a coupler 310, an antenna 314, and a memory 312. In some embodiments of the present disclosure, these components may be connected by using a bus or in another manner. A bus connection is used as an example in FIG. 3.

The antenna 314 is configured to convert electromagnetic energy in a transmission line into an electromagnetic wave in free space, or convert an electromagnetic wave in free space into electromagnetic energy in a transmission line. The coupler 310 is configured to divide a mobile communications signal into multiple signals, and allocate the signals to multiple receivers 308.

The transmitter 306 is configured to transmit (for example, modulate) a mobile communications signal generated by the processor 304. The receiver 308 is configured to receive (for example, demodulate) a mobile communications signal received by the antenna 314. The transmitter 306 and the receiver 308 can be regarded as a wireless modem. In some embodiments, there may be one or more transmitters 306 or receivers 308.

The input/output module is mainly configured to implement an interaction function between the terminal 300 and a user/an external environment, and mainly includes the audio output module 318, the audio input module 316, the display 320, and the like. During certain implementation, the input/output module may further include a camera, a touchscreen, a sensor, and the like. The input/output module communicates with the processor 304 by using the user interface 302.

The memory 312 is coupled to the processor 304, and is configured to store one or more programs. The one or more programs include an instruction. During implementation, the memory 312 may include a high-speed random access memory (RAM), and may also include a nonvolatile memory, such as one or more disk storage devices, a flash memory device, or another nonvolatile solid-state storage device.

In this embodiment of the present disclosure, for example, an audio collection module is the audio input module 316. The audio input module 316 is configured to collect an audio signal in an environment in which an electronic device is currently located.

The processor 304 is mainly configured to invoke the instruction stored in the memory 312, and perform the following steps determining whether an amplitude value of the audio signal collected by the audio input module 316 is less than a preset amplitude threshold and/or whether energy distribution of the audio signal meets a preset condition; and if the amplitude value of the audio signal is less than the preset amplitude threshold and/or the energy distribution of the audio signal does not meet the preset condition, determining that voice input of the electronic device is abnormal.

The processor invokes the instruction stored in the memory, so as to implement the implementations of the foregoing method embodiment. Therefore, for implementation of the terminal, refer to the implementation of the method. Repeated parts are not described.

Figure 4:
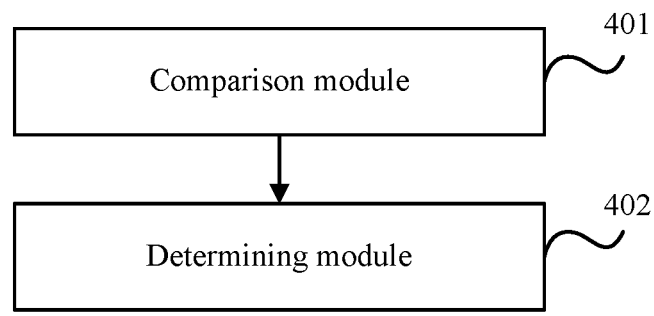
FIG. 4 is a schematic structural diagram of an apparatus according to an embodiment of the present disclosure.

As shown in FIG. 4, this embodiment of the present disclosure provides an apparatus. The apparatus provided in this embodiment of the present disclosure may be integrated in a terminal or an electronic device. The terminal or the electronic device includes at least an audio collection module. In an implementation, the apparatus provided in this embodiment of the present disclosure may be a constituent part of the processor in FIG. 2 or FIG. 3. The apparatus includes a comparison module 401 configured to determine, by means of comparison, whether an amplitude value of an audio signal collected by the audio collection module is less than a preset amplitude threshold and/or whether a ratio of a high-frequency energy value of the audio signal collected by the audio collection module to a low-frequency energy value of the audio signal is less than a preset threshold; and a determining module 402 configured to if the amplitude value of the audio signal is less than the preset amplitude threshold the ratio of the high-frequency energy value of the audio signal to the low-frequency energy value is less than the preset threshold, determine that voice input of the electronic device is abnormal.

The determining module 402 may include a first determining submodule configured to determine the amplitude value of the audio signal collected by the audio collection module; and a second determining submodule configured to perform Fourier frequency domain conversion on the audio signal, to determine the high-frequency energy value and the low-frequency energy value of the audio signal; and calculate a sum of energy values of audio signals whose frequency is higher than a preset frequency and use the sum as the high-frequency energy value, and calculate a sum of energy values of audio signals whose frequency is lower than the preset frequency and use the sum as the low-frequency energy value.

Optionally, before the comparison module determines, by means of comparison, whether the amplitude value of the audio signal collected by the audio collection module is less than the preset amplitude threshold and/or whether the ratio of the high-frequency energy value of the audio signal collected by the audio collection module to the low-frequency energy value of the audio signal is less than the preset threshold, the apparatus further includes a detection module.

The detection module is configured to detect whether a voice channel is established, and if it is detected that the voice channel is established, determine, by means of comparison, whether the amplitude value of the audio signal collected by the audio collection module is less than the preset amplitude threshold and/or whether the ratio of the high-frequency energy value of the audio signal collected by the audio collection module to the low-frequency energy value of the audio signal is less than the preset threshold.

Optionally, the apparatus further includes an adjustment module configured to adjust the audio collection module configured to collect the audio signal; and an output module configured to output prompt information, where the prompt information is used to notify a user that the voice input of the electronic device is abnormal.

Optionally, when the terminal or the electronic device includes multiple audio collection modules, the adjustment module is configured to determine a first audio collection module that is currently being used, and enable a second audio collection module in the multiple audio collection modules to collect the audio signal. The second audio collection module is any one of the multiple audio collection modules except the first audio collection module. An embodiment of the present disclosure further provides a computer readable storage medium. The readable storage medium stores program code used for implementing the voice input exception determining method described in the first aspect. The program code includes an execution instruction used for performing the voice input exception determining method described in the first aspect.

Based on a same disclosure concept, for a problem-resolving principle of the apparatus, refer to the implementation of the method embodiment of the present disclosure. Repeated parts are not described.

Optionally, an embodiment of the present disclosure further provides a nonvolatile computer readable storage medium storing one or more programs. The one or more programs include an instruction, and when the instruction is executed by an electronic device including an audio collection module, the electronic device performs the voice input exception determining method described in Embodiment 1.

Based on a same disclosure concept, for a problem-resolving principle of the nonvolatile computer readable storage medium, refer to the implementation of the method embodiment 1 of the present disclosure. Repeated parts are not described.

In addition, a person of ordinary skill in the art may understand that a part or all of the procedures of the method in the foregoing embodiments may be implemented by a computer program instructing relevant hardware. The program may be stored in a computer readable storage medium. When the program runs, the procedures of the methods in the embodiments are performed. The storage medium may include a magnetic disk, an optical disc, a read-only memory (ROM), a RAM, or the like.

According to the method and the apparatus provided in the embodiments of the present disclosure, the time domain feature and the frequency domain feature of the collected audio signal are comprehensively determined, to determine, according to the determining result, whether the voice input is abnormal. Therefore, the problem of the ineffective audio collection caused when the sound reception hole of the audio collection module is blocked is resolved. In addition, by using a method of comprehensively detecting an input amplitude value and an input frequency that are of a microphone, microphone input exception detection precision can be effectively improved.

The solutions of the present disclosure provide the fault tolerance and avoidance method performed after the microphone input exception is detected, so that impact exerted when the device cannot effectively collect the voice input data due to the microphone input exception can be reduced.

In addition, the solutions of the present disclosure further provide a user interaction manner performed after the microphone input exception is detected, so that a voice input exception that appears when the user uses the device is reduced, and user experience is improved.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a nonvolatile computer readable memory that can instruct the computer or any other programmable data processing device to work in a manner so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method comprising:
   determining whether an energy distribution of an audio signal for a voice input at a microphone of an electronic device meets a preset condition, the preset condition being whether a ratio of a high-frequency energy value of the audio signal to a low-frequency energy value of the audio signal is less than a preset value threshold, the high-frequency energy value being a first sum of energy values of audio signals whose frequency is higher than a preset frequency, and the low-frequency energy value being a second sum of energy values of audio signals whose frequency is lower than the preset frequency; and
   determining that the voice input at the microphone of the electronic device is abnormal when the energy distribution of the audio signal does not meet the preset condition.

2. The method of claim 1, wherein before determining whether the energy distribution of the audio signal at the microphone meets the preset condition, the method further comprises:
   detecting whether a voice channel is established; and
   determining whether the energy distribution of the audio signal meets the preset condition when the voice channel is established.

3. The method of claim 1, wherein determining whether energy distribution of the audio signal at the microphone meets the preset condition comprises:
   performing Fourier frequency domain conversion on the audio signal to determine an energy value of the audio signal;
   calculating a first sum of energy values of audio signals whose frequency is higher than a preset frequency and using the first sum of energy values as the high-frequency energy value;
   calculating a second sum of energy values of audio signals whose frequency is lower than the preset frequency and using the second sum of energy values as the low-frequency energy value;
   determining whether the ratio of the high-frequency energy value to the low-frequency energy value is less than the preset value threshold; and
   determining that the energy distribution of the audio signal does not meet the preset condition when the ratio of the high-frequency energy value to the low-frequency energy value is less than the preset value threshold.

4. The method of claim 2, wherein determining whether energy distribution of the audio signal at the microphone meets the preset condition comprises:
   performing Fourier frequency domain conversion on the audio signal to determine an energy value of the audio signal;
   calculating a first sum of energy values of audio signals whose frequency is higher than a preset frequency and using the first sum of energy values as the high-frequency energy value;
   calculating a second sum of energy values of audio signals whose frequency is lower than the preset frequency and using the second sum of energy values as the low-frequency energy value;
   determining whether the ratio of the high-frequency energy value to the low-frequency energy value is less than the preset value threshold; and
   determining that the energy distribution of the audio signal does not meet the preset condition when the ratio of the high-frequency energy value to the low-frequency energy value is less than the preset value threshold.

5. The method of claim 1, further comprising:
   adjusting the microphone when the voice input at the microphone of the electronic device is abnormal; or
   outputting prompt information comprising a notification that the voice input at the microphone of the electronic device is abnormal.

6. The method of claim 2, further comprising:
   adjusting the microphone; or
   outputting prompt information comprising a notification that the voice input at the microphone of the electronic device is abnormal.

7. The method of claim 3, further comprising:
   adjusting the microphone; or
   outputting prompt information comprising a notification that the voice input at the microphone of the electronic device is abnormal.

8. The method of claim 4, further comprising:
   adjusting the microphone; or
   outputting prompt information comprising a notification that the voice input at the microphone of the electronic device is abnormal.

9. The method of claim 5, further comprising providing a second microphone and adjusting the microphone comprises:
   determining that the microphone is currently being used; and
   enabling the second microphone of the plurality of microphones to collect the audio signal.

10. The method of claim 6, further comprising providing a second microphone and adjusting the microphone comprises:
    determining that the microphone is currently being used; and
    enabling the second microphone to collect the audio signal.

11. An electronic device, comprising:
    a microphone configured to collect an audio signal;
    a memory configured to store instructions; and
    a processor coupled to the memory and to the microphone and configured to execute the instructions to cause the processor to:
    determine whether an energy distribution of the audio signal for a voice input at the microphone meets a preset condition, the preset condition being whether a ratio of a high-frequency energy value of the audio signal to a low-frequency energy value of the audio signal is less than a preset value threshold, the high-frequency energy value being a first sum of energy values of audio signals whose frequency is higher than a preset frequency, and the low-frequency energy value being a second sum of energy values of audio signals whose frequency is lower than the preset frequency; and determine that the voice input at the microphone of the electronic device is abnormal when the energy distribution of the audio signal does not meet the preset condition.

12. The electronic device of claim 11, wherein the instructions further cause the processor to:
    detect whether a voice channel is established; and
    determine whether the energy distribution of the audio signal meets the preset condition when the voice channel is established.

13. The electronic device according to claim 11, wherein determining whether the energy distribution of the audio signal meets the preset condition comprises causing the processor to:
    perform Fourier frequency domain conversion on the audio signal to determine an energy value of the audio signal;
    calculate a first sum of energy values of audio signals whose frequency is higher than a preset frequency and use the first sum of energy values as the high-frequency energy value;
    calculate a second sum of energy values of audio signals whose frequency is lower than the preset frequency and use the second sum of energy values as the low-frequency energy value;
    determine whether the ratio of the high-frequency energy value to the low-frequency energy value is less than the preset value threshold; and
    determine that the energy distribution of the audio signal does not meet the preset condition when the ratio of the high-frequency energy value to the low-frequency energy value is less than the preset value threshold.

14. The electronic device of claim 11, wherein the instructions further cause the processor to:
    adjust the microphone to collect the audio signal when the voice input at the microphone of the electronic device is abnormal; or
    output prompt information, the prompt information comprising a notification that the voice input at the microphone of the electronic device is abnormal.

15. The electronic device of claim 14, further comprising a second microphone, and the instructions to cause the processor to adjust the microphone comprises causing the processor to:
    determine that the microphone is currently being used; and
    enable the second microphone to collect the audio signal.

16. A non-transitory computer readable storage medium storing program code which when executed by an electronic device comprising a microphone causes the electronic device to:
    determine whether an energy distribution of an audio signal for a voice input at the microphone meets a preset condition, the preset condition being whether a ratio of a high-frequency energy value of the audio signal to a low-frequency energy value of the audio signal is less than a preset value threshold, the high-frequency energy value being a first sum of energy values of audio signals whose frequency is higher than a preset frequency, and the low-frequency energy value being a second sum of energy values of audio signals whose frequency is lower than the preset frequency; and
    determine that the voice input of the electronic device is abnormal when the energy distribution of the audio signal does not meet the preset condition.

17. The non-transitory computer readable storage medium of claim 16, wherein prior to determining whether the energy distribution of the audio signal at the microphone meets the preset condition, the program code causes the electronic device to:
    detect whether a voice channel is established; and
    determine whether the energy distribution of the audio signal at the microphone meets the preset condition when the voice channel is established.

18. The non-transitory computer readable storage medium of claim 16, wherein the program code to determine whether energy distribution of the audio signal at the microphone meets the preset condition causes the electronic device to:
    perform Fourier frequency domain conversion on the audio signal to determine an energy value of the audio signal;
    calculate a first sum of energy values of audio signals whose frequency is higher than a preset frequency and use the first sum of energy values as the high-frequency energy value;
    calculate a second sum of energy values of audio signals whose frequency is lower than the preset frequency and use the second sum of energy values as the low-frequency energy value;
    determine whether the ratio of the high-frequency energy value to the low-frequency energy value is less than the preset value threshold; and
    determine that the energy distribution of the audio signal does not meet the preset condition when the ratio of the high-frequency energy value to the low-frequency energy value is less than the preset value threshold.

19. The non-transitory computer readable storage medium of claim 16, wherein the program code further causes the electronic device to:
    adjust the microphone when the voice input at the microphone of the electronic device is abnormal; or
    output prompt information, the prompt information comprising a notification that the voice input at the microphone of the electronic device is abnormal.

20. The non-transitory computer readable storage medium of claim 19, wherein the electronic device comprises a second microphone, and the program code to adjust the microphone causes the electronic device to:
    determine that the microphone is currently being used; and
    enable the second microphone to collect the audio signal.

* * * * *